United States Patent
Ahn et al.

(10) Patent No.: US 9,196,916 B2
(45) Date of Patent: Nov. 24, 2015

(54) NON-PROPULSIVE MINIATURE POWER DEVICE BASED ON SOLID OXIDE FUEL CELL AND COMBUSTION-DRIVEN THERMAL TRANSPIRATION PUMP

(71) Applicants: Jeongmin Ahn, Manlius, NY (US); Paul D. Ronney, Monrovia, CA (US)

(72) Inventors: Jeongmin Ahn, Manlius, NY (US); Paul D. Ronney, Monrovia, CA (US)

(73) Assignee: Syracuse University, Syracuse, NY (US)

( * ) Notice: Subject to any disclaimer, the term of this patent is extended or adjusted under 35 U.S.C. 154(b) by 169 days.

(21) Appl. No.: 14/097,115

(22) Filed: Dec. 4, 2013

(65) Prior Publication Data
US 2014/0154598 A1  Jun. 5, 2014

Related U.S. Application Data

(60) Provisional application No. 61/733,043, filed on Dec. 4, 2012.

(51) Int. Cl.
*H01M 8/06* (2006.01)
*H01M 8/12* (2006.01)

(52) U.S. Cl.
CPC .... *H01M 8/0618* (2013.01); *H01M 2008/1293* (2013.01); *H01M 2300/0074* (2013.01); *Y02E 60/50* (2013.01)

(58) Field of Classification Search
CPC .................. H01M 2008/1293; H01M 8/0618; H01M 2300/0074
See application file for complete search history.

(56) References Cited

U.S. PATENT DOCUMENTS

| | | | |
|---|---|---|---|
| 6,682,841 | B1 | 1/2004 | Armstrong |
| 7,488,547 | B1 * | 2/2009 | Iacovelli ........................ 429/434 |
| 7,862,331 | B2 | 1/2011 | Norton |
| 2004/0244356 | A1 | 12/2004 | Ronney |
| 2005/0155639 | A1 | 7/2005 | Perlo |
| 2006/0001569 | A1 | 1/2006 | Scandurra |
| 2008/0187806 | A1 | 8/2008 | Horiuchi |
| 2009/0162723 | A1 * | 6/2009 | Zhan ................................ 429/33 |
| 2009/0175736 | A1 | 7/2009 | Gianchandani |
| 2010/0266923 | A1 | 10/2010 | McElroy |
| 2011/0083710 | A1 | 4/2011 | Hsu |

FOREIGN PATENT DOCUMENTS

JP       2010232094        10/2010

OTHER PUBLICATIONS

Heinzel, A., Hebling, C., Muller, M., Zedda, M., Muller, C., Fuel Cells for Low Power Applications, Journal of Power Sources, 2002, pp. 250-255, vol. 105.
Steele, B.C.H., Middleton, P.H., Rudkin, R.A., Material Science Aspects of SOFC Technology with Special Reference to Anode Development, Solid State Ionics, 1990, pp. 388-393, vol. 40/41.
Kulikovsky, A.A., A Model for SOFC Anode Performance, Electrochimica Acta, 2009, pp. 6686-6695, vol. 54.

(Continued)

*Primary Examiner* — Stewart Fraser
(74) *Attorney, Agent, or Firm* — Frederick J. M. Price; David L. Nocilly; Bond Schoeneck & King, PLLC

(57) ABSTRACT

The present invention relates to a power device and, more particularly, to a non-propulsive thermal transpiration based micro single-chamber solid oxide fuel cell (SCSOFC) power device.

20 Claims, 8 Drawing Sheets

(56) References Cited

OTHER PUBLICATIONS

Steele, B.C.H., Heinzel, A., Materials for Fuel Cell Technologies, Nature, 2001, pp. 345-352, vol. 414.

Napporn, T., Jacques-Bedard, X., Morin, F., Meunier, M., Operating Conditions of a Single-Chamber SOFC, Journal of the Electrochemical Society, 2004, pp. A2088-A2094, vol. 151.

Horiuchi, M., Suganuma, S., Watanbe, M., Electrochemical Power Generation Directly from Combustion Flame of Gases, Liquids, and Solids, Journal of the Electrochemical Society, 2004, pp. A1402-A1405, vol. 151.

Shao, Z., Haile, S., A High-Performance Cathode for the Next Generation of Solid-Oxide Fuel Cells, Letters to Nature, 2004, pp. 170-173, vol. 431.

Murray, E., Tsai, T., Barnett, S., A Direct-Methane Fuel Cell with a Ceria-Based Anode, Letters to Nature, 1999, pp. 649-651, vol. 400.

Park, S., Vohs, J., Gorte, R., Direct Oxidation of Hyrdocarbons in a Solid-Oxide Fuel Cell, Letters to Nature, 2000, pp. 265-267, vol. 404.

Kronemayer, H., Barzan, D., Horiuchi, M., Suganuma, S., Tokutake, Y., Schulz, C., Bessler, W., A Direct-Flame Solid Oxide Fuel Cell (DFFC) Operated on Methane, Propane, and Butane, Journal of Power Sources, 2007, pp. 120-126, vol. 166.

Shao, Z., Haile, S., Ahn, J., Ronney, P., Zhan, Z., Barnett, S., A Thermally Self-Sustained Micro Solid-Oxide Fuel-Cell Stack with High Power Density, Nature, 2005, pp. 795-798, vol. 435.

Hermanson, J.C., Johari, H., Stocker, D.P., Hegde, U.G., Buoyancy Effects in Strongly Pulsed Turbulant Diffusion Flames, Combustion and Flame, 2004, pp. 61-76, vol. 139.

Reynolds, O., Phil. Trans. R. Soc. Lond., 1879, pp. 727-729, vol. 170.

York, D.C., Chambers, A., Chew, A.D., Thermal Transpiration of Helium and Nitrogen in 50-um Bore Silica Capillaries, Vacuum, 2000, pp. 910-918, vol. 59.

Microscale Thermal Transpiration Gas Pump, Nasa Tech Briefs, retrieved Nov. 17, 2008 from http://www.techbriefs.com/component/content/article/1363.

Wang, K., Ran., R., Zhou, W., Gu, H., Shao, Z., Ahn, J., Properties and Performance of $Ba_{0.5}SR_{0.5}Co_{0.8}Fe_{0.2}O_3$—$S+Sm_{0.2}Ce_{0.8}O_{1.9}$ Composite Cathode, Journal of Power Sources, 2008, pp. 60-68, vol. 179.

Wang, K., Ran, R., Hao, Y., Shao, Z., Jin, W., Xu, N., A High-Performance No-Chamber Fuel Cell Operated on Ethanol Flame, Journal of Power Sources, 2008, pp. 33-39, vol. 177.

Digiuseppe, G., Sun, L., Electrochemical Performance of a Solid Oxide Fuel Cell with an LSCF Cathode Under Different Oxygen Concentrations, International Journal of Hydrogen Energy, 2011, pp. 5076-5087, vol. 36.

Dyer, C.K., Fuel Cells for Portable Applications, Journal of Power Sources, 2002, pp. 31-34, vol. 106.

Rietveld, B., SOFC Related Research and Development within the Framework Programme of the European Union, ECS Transactions, 2007, pp. 17-23, vol. 7.

Ahn, J., Eastwood, C., Ronney, P., Zongping, S., Kwak, C., Haile, S., A Thermally Self-Sustaining Miniature Solid Oxide Fuel Cell Session 04S-13.

Kuhn, M., Napporn, T., Single-Chamber Solid Oxide Fuel Cell Technology—From its Origins to Today's State of the Art, Energies, 2010, pp. 57-134, vol. 3.

Ochoa, F., Eastwood, C., Ronney, P., Dunn, B., Thermal Transpiration Based Microscale Propulsion and Power Generation Devices, 7th international Microgravity Combustion Workshop, 2003.

Sakai, N., Yamaji, K., Horita, T., Ishikawa, M., Tokokawa, H., Kawada, T., Dokiya, M., Investigation of Diffusion Mechanism in Lanthanum Chromites, J. Mass Spectrom. Soc. Jpn., 1999, pp. 32-37, vol. 47, No. 1.

\* cited by examiner

Figure 1: The working mechanism of the solid oxide fuel cell

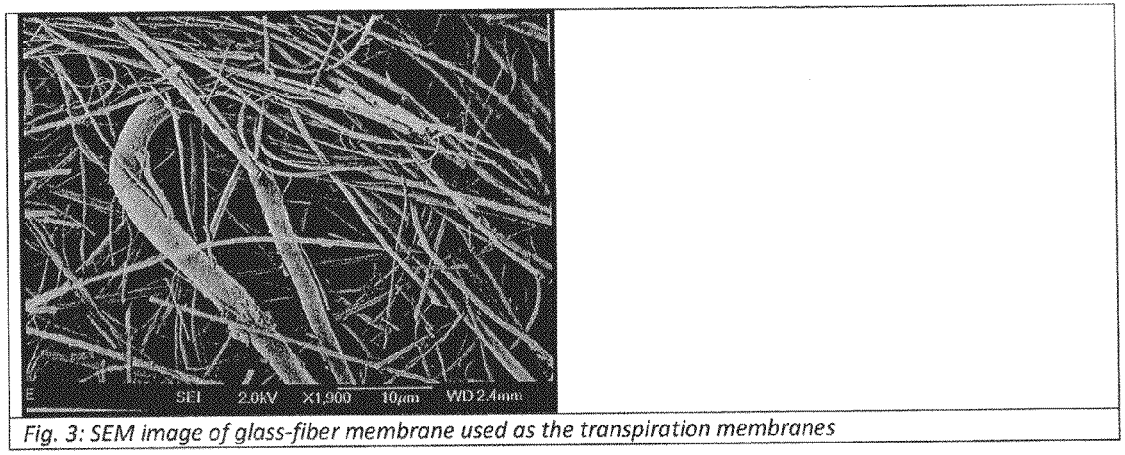
Fig. 3: SEM image of glass-fiber membrane used as the transpiration membranes

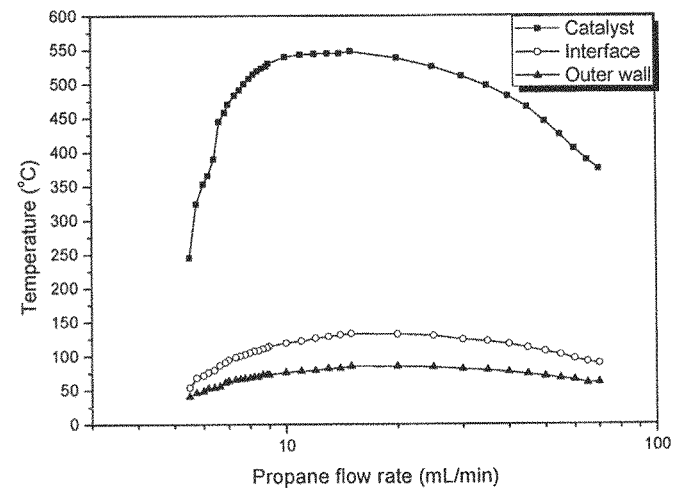
(a)
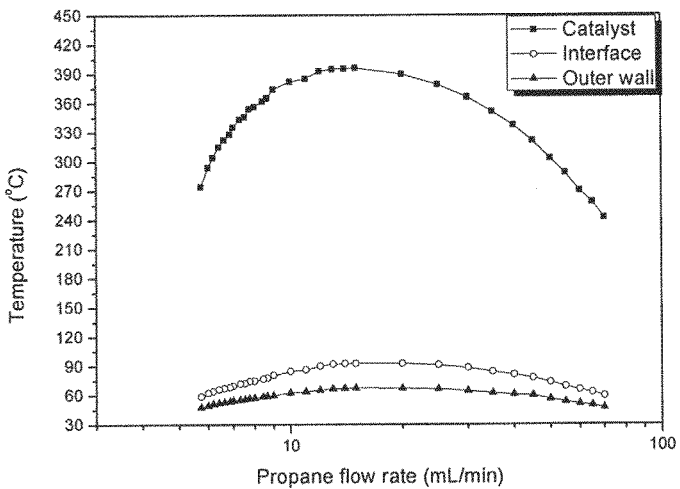
(b)
Fig. 4. Catalyst, interface and outer wall temperature curves under varied propane flow rates for (a) more porous and (b) less porous thermal guards

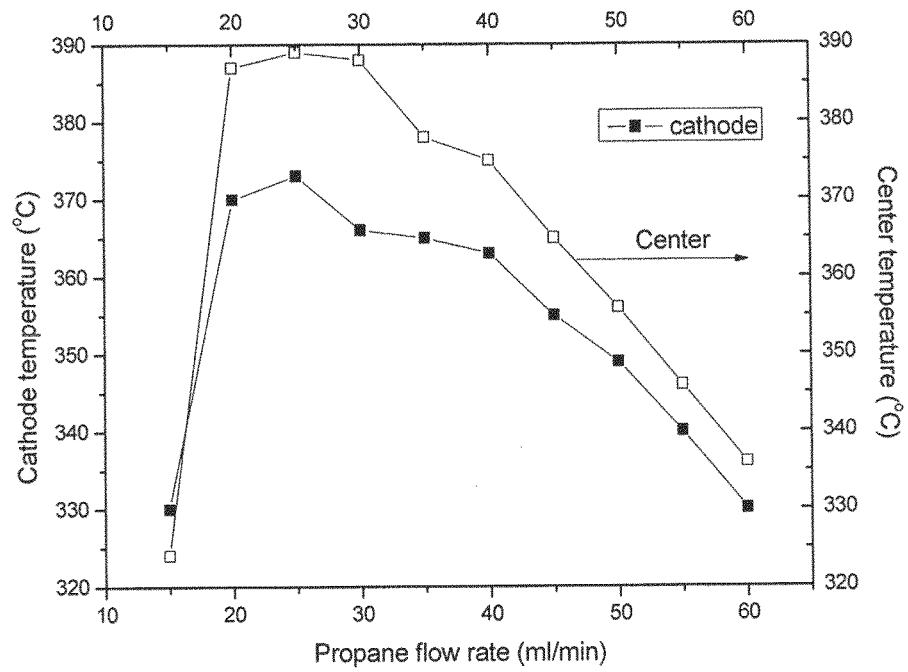
Fig. 5. The dependences of the catalyst center and cathode temperatures on the varied propane flow rates.

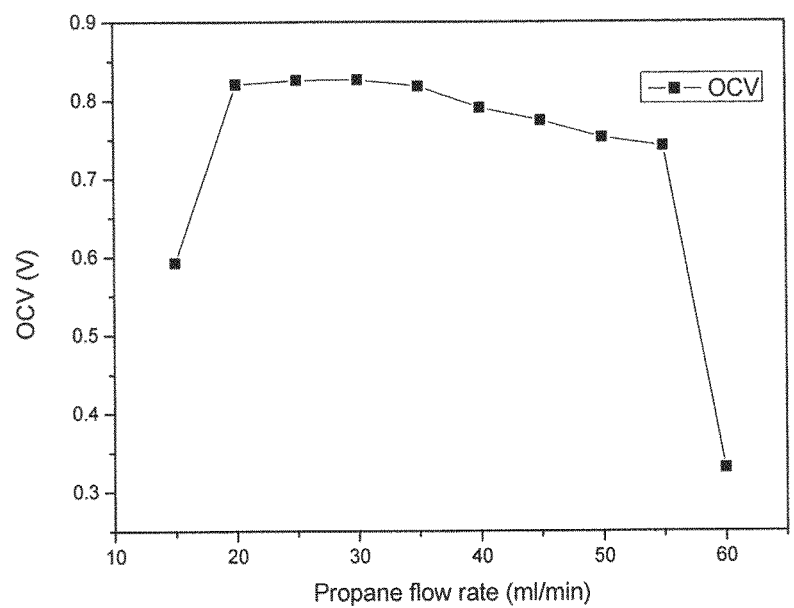
Fig. 6. The dependence of open circuit voltage (OCV) of the SCSOFCon the different propane flow rates.

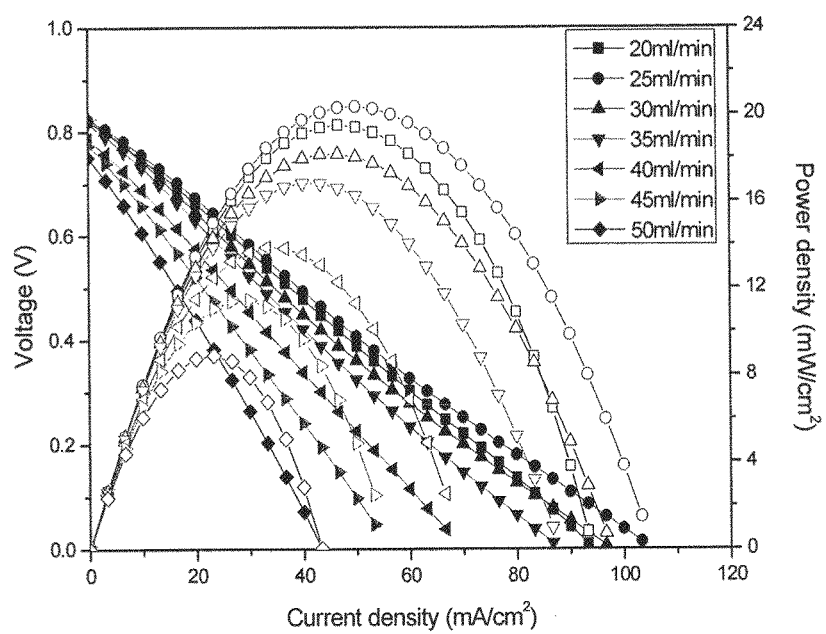
Fig. 7. Power performance of the SCSOFC

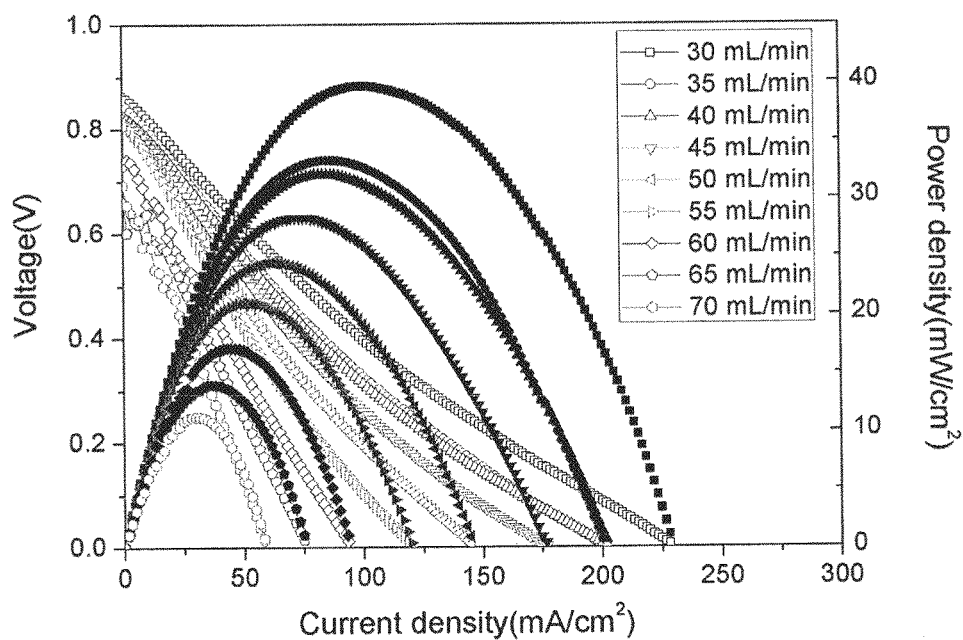
Fig. 8 Power performance of the SCSOFC placed in the device with double holes thermal guard ic solid oxide fuel cell (SCSOFC) power device...

NON-PROPULSIVE MINIATURE POWER DEVICE BASED ON SOLID OXIDE FUEL CELL AND COMBUSTION-DRIVEN THERMAL TRANSPIRATION PUMP

RELATED APPLICATION DATA

The present application claims the benefit of U.S. provisional patent application No. 61/733,043, filed Dec. 4, 2012, and is hereby incorporated by reference in its entirety.

BACKGROUND OF THE INVENTION

1. Field of the Invention

The present invention relates to a power device and, more particularly, to a non-propulsive thermal transpiration based micro single-chamber solid oxide fuel cell (SCSOFC) power device.

2. Description of the Related Art

Micro or meso fuel cells have received considerable attention over the past decades as a primary solution to the explosive demands of portable power sources or auxiliary power units for automobiles, due to their high energy efficiency, energy density and capability of using hydrocarbon fuels. In particular, solid-oxide fuel cells (SOFCs) have received considerable attention due to their fuel flexibility and use of inexpensive catalytic materials. FIG. 1 is a schematic illustration showing the basic principles of the operation of a solid oxide fuel cell, as should be understood by those skilled in the art. In general, the solid oxide fuel cell 100 consists of three components: (1) cathode 10 for oxygen reduction; (2) anode 20 for fuel oxidation; and (3) electrolyte 30 for oxide ion transportation. The resulting free electrons flow through the external circuit. The ideal performance of a SOFC depends on the electrochemical reaction occurring both on the anode and cathode sides. Typically, the ideal performance of the SOFC is represented by the cell voltage determined by the Nernst potential, which is a function of the gas pressure, fuel cell temperature, and partial pressures of reactants and products. A vast amount of literature presently exists detailing the improvements of SOFC obtained during the past decades (see, e.g., Steele B. C. H., Heinzel A. Nature, 414 (2001): 345-352; Napporn T. W, Be'dard X. J., Morin F. J. Electrochem. Soc., 151 (2004): 20888-2096; Horiuchi M., Suganuma S., Watanbe M. J. Electrochem. Soc., 151 (2004): 1402-1405; and Shao Z. P., Haile S. M., Nature, 431 (2004): 170-173), as should be understood by those skilled in the art.

Description of the Related Art Section Disclaimer: To the extent that specific patents/publications/products are discussed above in this Description of the Related Art Section or elsewhere in this Application, these discussions should not be taken as an admission that the discussed patents/publications are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications are discussed above in this Description of the Related Art Section and/or throughout the application, they are all hereby incorporated by reference into this document in their respective entirety(ies).

SUMMARY OF THE INVENTION

The present invention recognizes that there are potential problems and/or disadvantages that must be faced and solved with respect to conventional devices to realize a particular use of the SOFC as a portable power source. Firstly, although some problems associated with using hydrogen as the fuel, such as production, storage, and transportation, could be solved through using hydrocarbon fuels as alternatives, there are other existing problems related to hydrocarbon fuels. For example, when operating a SOFC, the fuel and air/oxygen must be introduced to anode and cathode chambers respectively (for a dual-chamber SOFC) (see, e.g., Murray E. P., Tsai, T., Barnett S. A., Nature 400 (1999): 649-651), or the mixture of these two gases must be moved into device (for a single-chamber SOFC or a direct flame SOFC) (see, e.g., Park S., Vohs J. M., Gorte R. J., Nature 404 (2000): 265-267; Kronemayer H., Barzan D., Horiuchi M., J. Power Sources 166 (2007): 120-126). These two gas introducing processes require gas pressurization or pumping systems, both of which usually require devices with moving parts. Unfortunately, these kinds of devices at a small scale experience more difficulties with heat and friction losses due to higher surface to volume ratios that other macroscale counterparts. Other issues include sealing, fabrication, and assembly as well as problems with thrust to mass ratios. Also, the thermal management at meso or microscales is a significant drawback for use of SOFC as a transportable power source. And, the heat supplied to a SOFC system will lead to some parasitic energy consumption, therefore lead to a reduction of energy efficiency of the SOFC itself. Fortunately, a thermally self-sustained micro SOFC has been reported in the literature (see Shao Z. P., Haile S. M., and Ahn, J. M. et al. Nature, 435 (2005): 795-799). However, the uses of mixture of fuel and oxygen still results in the problems stated above. Moreover, even though in a direct flame SOFC the issue of heat supply can be neglected, it is compounded by other problems like the highly orientation dependent flame introduced by the buoyancy force into the device (see Hermanson, J. C., Johari, H., Stocker, D. P., Hegde, U. G., Combustion and Flame, 139 (2004): 61-76). Therefore, it will be very difficult to control the small device because of its limited working orientation. Various embodiments of the present invention may be advantageous in that they may solve or reduce one or more of the potential problems and/or disadvantages discussed in this paragraph.

Various embodiments of the present invention may exhibit one or more of the following objects, features and/or advantages:

It is therefore a principal object and an advantage of the present invention to provide a micro fuel cell in which at least one, and preferably all of the above-references problems are addressed.

It is a further object and advantage of the present invention to provide a micro fuel cell that does not have a need to pump the gas using an extra energy source (and, thus at least some and preferably all of the problems associated with pumping of gases mentioned above can be overcome), because the fuel and oxygen needed in this system will automatically flow into the chamber by thermal transpiration process.

It is another object and advantage of the present invention to provide a micro fuel cell that is thermally self sustained (i.e., after ignition, all the heat can be produced by the continuous oxidation reaction), eliminating the significant drawback of thermal management that is an issue related to conventional micro fuel cells.

It is a further object and advantage of the present invention to provide a micro fuel cell that is orientation independent.

In accordance with the above-referenced objects and advantages, an embodiment of the present invention is directed to a thermal transpiration based micro single-chamber SOFC (SCSOFC) power device. Thermal transpiration, the flow of molecules from cold regions to hot regions, causes the establishment of a pressure difference at a steady state. This effect can occur in porous membranes or capillary tubes when two conditions are satisfied: (1) the mean free path of the gas molecules is comparable to pore or tube diameter and (2) a temperature gradient is imposed in a solid phase along the length of the pore or tube. In the event of these two occurrences, a pressure gradient is induced in the gas, causing a flow from the cold end of the pores or tubes to the hot.

In accordance with an embodiment of the present invention, specific glass fibers, whose characteristic length L (here, the average diameter of the pores in porous glass fiber used) can be several micrometers, are used to form two different regions with different temperatures. The Knudsen number (Kn=$\lambda$/r, where $\lambda$ is the mean free path of gas molecules (about 68 nm for air at ambient conditions) and r is a characteristic channel or pore radius) is sufficiently small. Where Kn<<1 and the transpiration-induced pressure rise is small compared to the inlet pressure, the transpiration-induced volumetric flow rate ($\dot{V}$) reduces to $$\dot{V}_1 = \frac{2c_1 A}{\sqrt{\gamma}} \frac{r}{L} \sqrt{\frac{T_1(T_2-T_1)^2}{(T_2+T_1)^3}} Q_T$$

where c is the sound speed, A the membrane area, $\gamma$ the gas specific heat ratio, L the membrane thickness, T the temperature, $Q_T$(Kn) a flow coefficient (for Kn<<1, $Q_T \approx 0.64$ Kn) and the subscripts 1 and 2 refer to conditions at the low-temperature inlet and high-temperature outlet of the transpiration device. Since the Knudsen number Kn (Kn=$\lambda$/L, $\lambda$ is the mean free path of gas molecules) of the specific glass fibers of an embodiment of the present invention can be between 0.01 to 10, the gaseous conditions in this system are transitional between continuum and rarefied-gas flow (see S. E. Vargo, E. P. Muntz, G. R. Shiflett, W. C. Tang, *J. Vac. Sci. Technol.* A 17 (1999) 2308-2313; and E. P. Muntz, Y. Sone, K. Aoki, S. Vargo, M. Young, *J. Vac. Sci. Technol.* A 20 (2002) 214-222) and the thermal transpiration conditions will be satisfied once the two regions separated by a thermal transpiration membrane show any temperature difference. The higher the temperature difference, the higher will be the resulting flow rate through the thermal transpiration.

As further described in the Detailed Description Section below, a cubic thermal transpiration membrane chamber (3×3×3 cm) housed with a high thermal conductive thermal guards was constructed. In the chamber, there is a SCSOFC, and its anode is positioned facing the center of chamber for the hydrocarbon fuel combustion. The hydrocarbon fuel can include for example, propane, butane, iso-butane, ethane, pentane, methane, natural gas, etc. After a hydrocarbon fuel (which can be easily stored and supplied, the reason is interpreted in work Shao Z. P., Haile S. M., Ahn J. M., et al. Nature, 435 (2005): 795-799) of controlled flow rates is introduced into the chamber, it is ignited with a resistance heating igniter. The igniter is turned off immediately after the ignition of the hydrocarbon fuel. The catalytic combustion of the hydrocarbon fuel renders a much higher temperature of the chamber than that of the surrounding. As mentioned above, here both the two necessary factors (gaseous transitional or molecular conditions, and the temperature difference) for thermal transpiration are satisfied, consequently the phenomenon of thermal transpiration will occur. Therefore the air will automatically flow from the surrounding (cold side) to the chamber (hot side). The oxygen that was pumped from the surrounding (cold side) can support a further oxidation of the hydrocarbon furl which can sustain the temperature gradient between the chamber (hot side) and surrounding (cold side), therefore more and more oxygen can be pumped into the chamber. This oxygen is not only the oxidant for hydrocarbon fuel, but can also be the oxidant for cathode of the SCSOFC. The products of the catalytic combustion of hydrocarbon fuel and oxygen can serve as the fuels (i.e. $CO+H_2$) for the anode of the SCSOFC. For fuels that are not stored as compressed gases or have low vapor pressure, the transpiration process can also be used to draw the fuel as well as oxygen into the chamber.

BRIEF DESCRIPTION OF THE DRAWINGS

The present invention will be more fully understood and appreciated by reading the following Detailed Description in conjunction with the accompanying drawings, in which:

FIG. 3 is a SEM image of the glass microfiber selected as the transpiration membrane of the SCSOFC device, according to an embodiment of the present invention.

FIG. 4(a)-(b) are graphical illustrations of the catalyst, interface, and outer wall temperature curves under varied propane flow rates for more porous (a) and less porous (b) thermal guards, according to an embodiment of the present invention.

FIG. 5 is a graphical illustration of the dependencies of the catalyst center and cathode temperatures on the varied propane flow rates, according to an embodiment of the present invention.

FIG. 6 is a graphical illustration of the dependence of an open circuit voltage (OCV) of the SCSOFC on the different propane flow rates, according to an embodiment of the present invention.

FIG. 7 is a graphical illustration of the power performance of the SCSOFC operated on different propane flow rates with a thermal transpiration based pumping device, according to an embodiment of the present invention.

FIG. 8 is a graphical illustration of the power performance of the SCSOFC placed in the device with double porosity thermal guard, according to an embodiment of the present invention.

DETAILED DESCRIPTION

Figure 1:
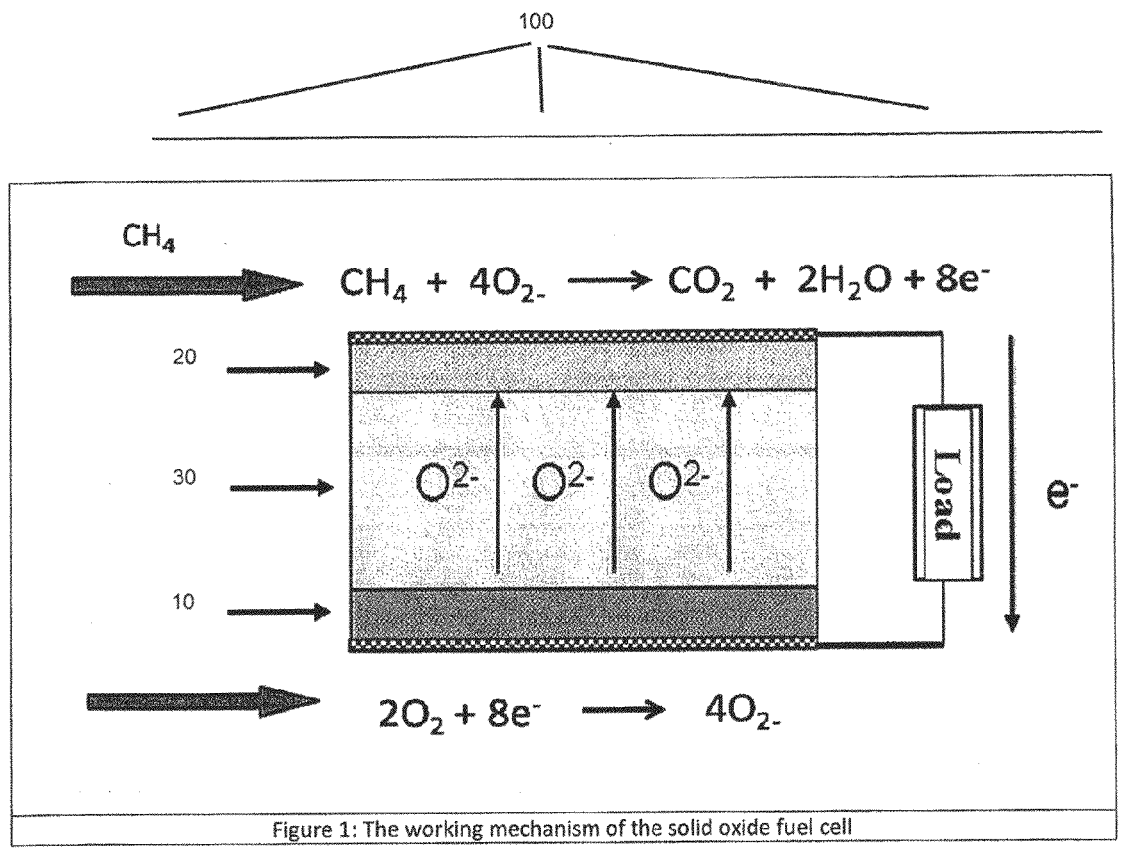
FIG. 1 is a schematic illustration showing the basic principles of the operation of a solid oxide fuel cell.

The present invention will be more fully understood and appreciated by reading the following Detailed Description in conjunction with the accompanying drawings, wherein like reference numerals refer to like components.

Advantages of the invention are illustrated by the following Examples. However, the particular materials and amounts thereof recited in these examples, as well as other conditions and details, are to be interpreted to apply broadly in the art and should not be construed to unduly restrict or limit the invention in any way.

EXAMPLES

Example 1

Starting Materials

This Example sets forth the starting materials used in the following Examples. The starting materials for electrolyte, anode and cathode of the SCSOFC of an embodiment of the present invention were $Sm_{0.2}Ce_{0.8}O_{1.9}$ (SDC, NexTech materials) electrolyte, NiO+SDC (60:40 w/w, NexTech materials) anode and $Ba_{0.5}Sr_{0.5}Co_{0.8}Fe_{0.2}O_{3-\delta}$ (BSCF)+SDC (70:30 w/w, see details of the synthesis of BSCF in Wang K., Ran R., Zhou W., Gu H. X., Shao Z. P., J. Power Sources, 179 (2008): 60-68) cathode.

Example 2

SCSOFC Preparation

This Example describes the preparation of the SCSOFC of an embodiment of the present invention. The SCSOFC was prepared by employing a co-pressing technique as described in Wang K., Ran R., Hao Y., Shao Z., Jin W., Xu N., J. Power Sources 177 (2008): 33-39. In brief, the NiO+SDC powders were first pressed as substrates; SDC powders were then added onto the substrates and pressed again to form bi-layer pellets, which were fired in air at 1350° C. for 5 hours in order to achieve a dense electrolyte layer (~20 μm). Then the bi-layer pellets were reduced at 600° C. for 3 h using hydrogen to convert NiO to Ni. Following the deposition of cathode (0.6 cm²), the complete cells were sintered at 1000° C. for 5 hours in nitrogen.

A schematic of the cubic thermal transpiration based SCSOFC power generation device 200 is shown in FIG. 2a-b, according to an embodiment of the present invention. In particular, FIG. 2a shows an integral schematic of the thermal transpiration based SCSOFC power generation device 200, and FIG. 2b shows an exploded/decomposed schematic of the thermal transpiration based SCSOFC power generation device 200. The thermal transpiration based SCSOFC power generation device 200 includes, but is not limited to, an exhaust pipe 210, an ignition wire 220, a thermal guard 230, a thermal transpiration membrane chamber 240 (preferably formed from six thermal transpiration membranes), a SCSOFC 250, a mixing chamber 260, and a fuel inlet 270. For purposes of clarity, "SCSOFC" is 'Single Chamber Solid Oxide Fuel Cell' (fuel cell: 250). The SCSOFC consists of three layers attached together as one piece. Three layers (cathode, electrolyte, and anode) are shown as in one piece of disk. The small black dot is the cathode, which faces outward and is placed close to the wall. The opposite is the anode side. And there is a very thin layer between anode and cathode, which is electrolyte later. Reference numeral 200 is the complete system and includes thermal transpiration pump (thermal guard and thermal transpiration membrane), and SCSOFC, according to an embodiment of the present invention.

Figure 2:
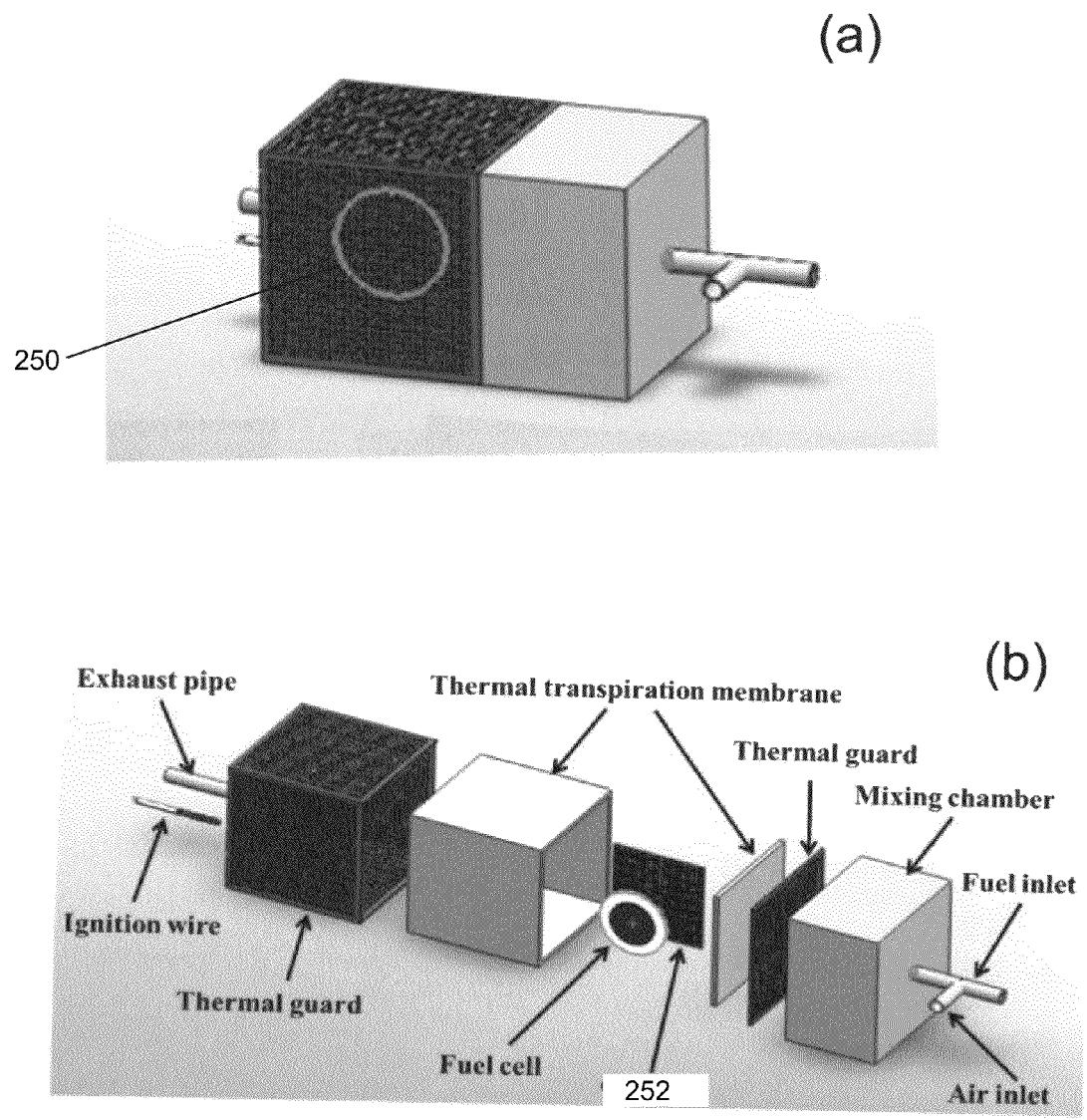
FIG. 2(a)-(b) are schematic illustrations of a thermal transpiration based SCSOFC power generation device (integral view and exploded/decomposed view, respectively), according to an embodiment of the present invention.

Glass microfiber (Ahlstrom products) with a pore size of 3.1 μm, shown by the SEM in FIG. 3, was selected as the transpiration membranes. As shown in FIG. 2b, six pieces of transpiration membranes 240 are housed by a cubic highly thermal conducting iron thermal guard 230, to form a cubic chamber for catalytic reaction of fuel and power generation of SCSOFC 200. There are arrays of small holes (~250 μm holes spaced ~500 μm apart) machined in the six faces of the thermal guard 230, the comparative bigger size of the holes (as compared to the 3.1 μm pore size of the glass microfiber) therefore render the gas flow through them in a continuum regime. All six sides of the cube transpired reactants. Five faces were exposed to ambient and thus transpired air only. The sixth face (FIG. 2, right side) transpired both fuel (propane) fed and air into a mixing chamber. The side opposite the mixing chamber was fitted with an exhaust pipe (large enough diameter to avoid reverse thermal transpiration—in the case of Kn<<0.01) and electrical feed-throughs for a hot-wire igniter, fuel cell leads and K-type thermocouples to measure gas, catalyst and SCSOFC temperatures. Two of the thermal guard chambers have a volume of 3×3×3 cm, and one of these two thermal guard chambers has double the porosity of the other one; and the other two thermal guard chambers are 2×2×2 cm in size, and one of these also has double the porosity of the other one (for a total of 4 different kinds of thermal transpiration combustors in accordance of an embodiment of the present invention; see Table 1 below).

TABLE 1

| | Size (cm) | Thermal guard porosity (%) | Membrane pore diameter (μm) |
| --- | --- | --- | --- |
| Combustor 1 | 2 × 2 × 2 | 21 | 3.1 |
| Combustor 2 | 2 × 2 × 2 | 42 | 3.1 |
| Combustor 3 | 3 × 3 × 3 | 21 | 3.1 |
| Combustor 4 | 3 × 3 × 3 | 21 | 1.2 |

As shown in FIG. 2(b), in a preferable embodiment, the SCSOFC is placed one third of the chamber length far from one of the sides of the chamber with the cathode facing outward (i.e., here, the cathode is facing the membrane (chamber wall), not center of the chamber) to maximize its exposure to transpired air. This is expected since if the cell is too close to the membrane, the cell temperature is low, whereas if it is too close to the center of chamber, there is more fuel flow to the cathode side and thus more opportunity for undesired fuel oxidation on the cathode.

Four silver threads are used to study the electrical performance of the fuel cell. Silver wires are used for electrical connections. And, current-voltage polarization curves are collected using a 2420 source meter.

Example 3

Thermal Difference Sustained by Self-Sustaining Catalytic Combustion

This Example describes the use of the two smaller thermal guard chambers with a same size of 2×2×2 cm to demonstrate the thermal transpiration phenomenon. As noted, one of these thermal guard chambers has double the porosity of the other one.

In brief, a Pt mesh catalyst 252 was placed at the center of the glass fiber chamber and ignited. The electronic igniter is used to heat up and then ignite the hydrocarbon fuel in the membrane chamber, after the ignition of the hydrocarbon fuel the igniter is turned off immediately. The hydrocarbon fuel can be easily ignited at a low temperature of about 280° C. (propane), and the device can self-sustain the combustion without the igniter on. With the continuous combustion of hydrocarbon fuel and coming air, the temperature of the Pt catalyst center is becoming higher and higher which consequently leads to a gradual increase in the temperature of the interface between glass fiber membrane and thermal guard. The increase tendency of interface temperature is the same of that of Pt center temperature.

After a short time for stabilization, the temperatures of the Pt catalyst will be stabilized at each specified fuel flow rate. FIG. 4(a) and FIG. 4(b) show the catalyst, interface and outer wall temperature curves under varied propane flow rates for more porous and less porous thermal guards, respectively.

FIG. 4(a) shows a phenomenon that the propane flow rates of between 10 to 20 mL/min will result in higher temperatures of catalyst. Especially for the 15 ml/min which can heat the Pt temperature to a highest value of 550° C. For all propane flow rates of between 5 to 70 mL/min, the device can self-sustain the catalytic combustion, which demonstrates that there is air continuously pumped from the relative colder atmosphere through the glass fiber membranes to the hotter membrane chamber. Theoretically, the mean free path λ of air at standard condition is about 68 nm. So the Knudsen number Kn (Kn=λ/L) is 0.021, which meets the requirement for a transitional gaseous condition as set forth in S. E. Vargo, E. P. Muntz, G. R. Shiflett, W. C. Tang, *J. Vac. Sci. Technol.* A 17 (1999) 2308-2313; and E. P. Muntz, Y. Sone, K. Aoki, S. Vargo, M. Young, *J. Vac. Sci. Technol.* A. 20 (2002) 214-222, as referenced above. Therefore there should be thermal transpiration existing in this device. The experimental results using the designed device of an embodiment of the present invention further proves the existence of thermal transpiration.

FIG. 4(*a*) and FIG. 4(*b*) show the effect of thermal guard porosity on catalyst temperatures. The minimum fuel flow is very similar to these two combustors, which is expected since the lower porosity and thus more restricted air flow is not limiting at low fuel flows (thus low air flow requirement). For both combustors, the highest temperature occurs near 15 mL/min fuel flow, however, the higher-porosity combustor shows a higher catalyst temperature (550° C. vs. 400° C.), probably due to decreased significance of air flow restriction at higher fuel flows (thus higher air flow requirement).

Example 4

Power Generation

This Example describes the use of a bigger thermal guard chamber with a size of 3×3×3 cm for the SCSOFC power generation device to test the fuel cell performance under the thermal transpiration condition.

The thermal guard has ~680 of 0.5×0.5 mm holes on its each surface. As shown in FIG. 2*a*, SCSOFC was placed about 0.5 cm away from the transpiration membrane with the cathode facing outward to maximize its exposure to transpired air. This is expected since if the cell is too close to the membrane, the cell temperature is low, whereas if it is too close to the center of chamber, there is more fuel flow to the cathode side and thus more opportunity for undesired fuel oxidation on the cathode. Once the hydrocarbon fuel in the membrane chamber (the chamber formed by the thermal transpiration membrane) is ignited, the catalytic combustion is initiated and sustained. Then parts of products of the catalytic combustion supplies the anode of SCSOFC with fuel, and the heat released by the combustion results in the temperature difference between the membrane chamber and atmosphere which therefore result in the thermal transpiration of air into the membrane chamber to serve the cathode of SCSOFC. Thus, the power generation of the SCSOFC placed in the chamber is achieved.

The effect of fuel flow rate on catalyst center and cathode temperatures is shown in FIG. 5. It shows that both reached their maxima (390 and 375° C., respectively) at the same fuel flow rate (25 mL/min).

The effect of fuel flow rate on SCSOFC open circuit voltage (OCV) is shown in FIG. 6. It shows that the effect of fuel flow rate on OCV is weak in the range of between 20 and 50 mL/min.

FIG. 6 also shows that the OCV of 0.85 V is reasonably close to the theoretical maximum (1.06 V, particularly independent of temperature) for propane-air mixtures, indicating that (1) transpiration delivers sufficient concentrations of both reactants to the cell and (2) the anode and cathode catalysts are sufficiently selective under these conditions (with premixed reactants, if there were no anode selectivity for fuel oxidation or cathode selectivity for oxygen reduction, the OCV would be zero).

The polarization curve for an SCSOFC in low porous thermal guard is shown in FIG. 7. The trends shown closely follow the temperature, which is expected since all of the SCSOFC temperatures obtained in this study are below those corresponding to maximum power, thus higher temperature will lead to higher power output. Of course, higher temperature also increases transpiration flow and thus transport rates, but the polarization curve shows that reactant transport is not a limiting factor in our tests.

Since it was demonstrated that larger thermal guard porosity results a better thermal transpiration process of the device, this a higher temperature on the catalyst surface, and larger overall device size also increases performance, a thermal guard with a size of 3×3×3 cm and double porosity on each surface was used to test the fuel cell performance.

FIG. 8 shows the polarization curve for an SCSOFC in the device with double porosity thermal guard. The highest power density obtained was 40 mW/cm$^2$ at a propane flow rate of 30 mL/min, which is nearly twice of the highest performance in FIG. 7.

With the two conditions (which are gaseous conditions of transitional and temperature difference) satisfied, the designed devices were qualified to be used for the thermal transpiration based power generation system. It was shown that larger thermal guard porosity (thus increased usable transpiration membrane area) and larger overall device size increased performance.

When one compares the power performance obtained in the device of an embodiment of the present invention with that of a typical SCSOFC using fuel/oxygen mixture and heating device to sustain the temperature, it may still be necessary to seek improvement in its power density. However, since the fuel can self-sustain and plenty of oxygen is automatically pumped into the membrane chamber, a beneficial aspect of the device of an embodiment of the present invention vs. conventional devices is the improvement of the temperature.

While several embodiments of the invention have been discussed, it will be appreciated by those skilled in the art that various modifications and variations of the present invention are possible. Such modifications do not depart from the spirit and scope of the present invention.

What is claimed is:

1. A thermal transpiration-based single chamber solid oxide fuel cell power generation device comprising:
   a thermal transpiration membrane chamber made from a porous material comprising a Knudsen number of between 0.01 and 10;
   a solid oxide fuel cell housed within said thermal transpiration membrane chamber; and
   a hydrocarbon fuel source;
   wherein said device is configured to self sustain combustion of hydrocarbon fuel within said thermal transpiration membrane chamber from the hydrocarbon fuel source after ignition of said fuel thereby creating a temperature gradient between the inside and outside of said thermal transpiration membrane chamber, wherein the temperature within the inside of said thermal transpiration membrane chamber is higher than the temperature on the outside of said thermal transpiration membrane chamber, and whereby the hydrocarbon fuel from the hydrocarbon fuel source and ambient air comprising oxygen outside of said thermal transpiration membrane chamber flows through said thermal transpiration membrane chamber to the inside of said thermal transpiration membrane chamber.

2. The thermal transpiration-based single chamber solid oxide fuel cell power generation device of claim 1, further comprising a thermally-conductive thermal guard wherein said thermal guard surrounds said thermal transpiration membrane chamber.

3. The thermal transpiration-based single chamber solid oxide fuel cell power generation device of claim 2, wherein said thermal guard is made from iron.

4. The thermal transpiration-based single chamber solid oxide fuel cell power generation device of claim 3, wherein said thermal guard is cube-shaped and formed from six substantially equally sized plate-shaped portions.

5. The thermal transpiration-based single chamber solid oxide fuel cell power generation device of claim 4, wherein at least one of said plate-shaped portion of said thermal guard comprises an array of holes.

6. The thermal transpiration-based single chamber solid oxide fuel cell power generation device of claim 5, wherein each of said holes in said array of holes has an approximate diameter larger than the average diameter of the pores in said thermal transpiration membrane chamber.

7. The thermal transpiration-based single chamber solid oxide fuel cell power generation device of claim 6, wherein each of said holes in said array of holes has an approximate diameter of 250 µm.

8. The thermal transpiration-based single chamber solid oxide fuel cell power generation device of claim 7, wherein each of said holes in said array of holes is spaced approximately 500 µm apart.

9. The thermal transpiration-based single chamber solid oxide fuel cell power generation device of claim 1, wherein:
said porous material comprises glass microfibers; and
said thermal transpiration membrane chamber is cube-shaped and formed from six substantially equally sized glass microfiber transpiration membranes.

10. The thermal transpiration-based single chamber solid oxide fuel cell power generation device of claim 1, wherein the pores in the porous thermal transpiration membrane chamber comprise an average diameter of between about 1 µm and 3.1 µm.

11. The thermal transpiration-based single chamber solid oxide fuel cell power generation device of claim 1, wherein said solid oxide fuel cell comprises an anode, a cathode, and an electrolyte.

12. The thermal transpiration-based single chamber solid oxide fuel cell power generation device of claim 11, wherein said electrolyte is made from $Sm_{0.2}Ce_{0.8}O_{1.9}$.

13. The thermal transpiration-based single chamber solid oxide fuel cell power generation device of claim 11, wherein said anode is made from $NiO+Sm_{0.2}Ce_{0.8}O_{1.9}$.

14. The thermal transpiration-based single chamber solid oxide fuel cell power generation device of claim 11, wherein said cathode is made from $Ba_{0.5}Sr_{0.5}Co_{0.8}Fe_{0.2}O_{3-\delta}+Sm_{0.2}Ce_{0.8}O_{1.9}$.

15. The thermal transpiration-based single chamber solid oxide fuel cell power generation device of claim 1, further comprising a catalyst within said thermal transpiration membrane chamber.

16. The thermal transpiration-based single chamber solid oxide fuel cell power generation device of claim 1, wherein the hydrocarbon fuel source comprises a flow rate of between 5 and 70 mL/min when in use.

17. The thermal transpiration-based single chamber solid oxide fuel cell power generation device of claim 16, wherein the flow rate is about 15 mL/min.

18. The thermal transpiration-based single chamber solid oxide fuel cell power generation device of claim 1, wherein the Knudsen number is about 1.

19. The thermal transpiration-based single chamber solid oxide fuel cell power generation device of claim 2, wherein the thermal conductive thermal guard has a volume of about 3×3×3 cm.

20. The thermal transpiration-based single chamber solid oxide fuel cell power generation device of claim 2, wherein the thermal conductive thermal guard has a volume of about 2×2×2 cm.

* * * * *